STEP AUTOMATIC GAIN CONTROL SYSTEM

Filed Nov. 1, 1960 2 Sheets-Sheet 1

INVENTORS.
GEORGE V. LENNON III
HERMANN LINS JR.
BY
ATTORNEY

United States Patent Office 3,116,453

Patented Dec. 31, 1963

3,116,453

STEP AUTOMATIC GAIN CONTROL SYSTEM

George V. Lennon III and Hermann Lins, Jr., Rochester, N.Y., assignors to General Dynamics Corporation, Rochester, N.Y., a corporation of Delaware Filed Nov. 1, 1960, Ser. No. 66,521
3 Claims. (Cl. 325—319)

This invention relates to automatic gain controls for communication equipment and is particularly directed to automatic gain control circuits for radio and other systems involving intermittent transmission of a carrier wave, as in keyed CW (continuous wave), pulsed radar, or single sideband systems.

Automatic gain control circuits for conventional receivers of amplitude modulated carriers includes means for sampling the carrier strength and deriving a D.C. voltage proportional in amplitude to carrier strength and feeding this D.C. back to the IF or RF amplifiers for changing the sensitivity of the amplifiers in response to carrier strength. Unfortunately, where the carrier is not present at all times but is intermittent only, as in keyed CW, pulsed radar, or single sideband, a meaningful D.C. voltage for AGC purposes cannot be derived.

One of the more popular AGC schemes for suppressed carrier signals involves detection of a portion of the incoming signal using a diode network having a short time constant when charging the detecting and integrating circuit of the AGC loop and having a comparatively long time constant when discharging the integrating circuit. This type of AGC scheme has been usually called a "fast attack-slow release" AGC system. Although this method of providing an AGC control voltage yields considerable advantage over conventional AGC systems, it still leaves much to be desired. For example, the reception of a strong noise signal on-resonance will cause the receiver to desensitize for the duration of the slow release time. On the other hand, if the AGC discharge or "hang" time is long enough to maintain a constant AGC voltage over the irregular intelligence presented, it is much too slow to respond to rapid changes in signal strength.

The principal object of this invention is to provide an improved automatic gain control system which is efficient in suppressed carrier systems for keyed CW, pulsed radar, or single sideband signals as well as for conventional amplitude modulated signals.

A more specific object of this invention is to provide an automatic gain control system radio-type communications where the control voltage must be derived from a wave which not only varies widely in amplitude but is intermittent.

The objects of this invention are attained by deriving two signal voltages of different levels and integrating the higher voltage in a detecting and integrating circuit with a short time decay, and integrating the lower voltage in a detecting and integrating circuit with a relatively long decay, or "hang," time. The decaying voltages of the two integrating circuits are compared in a comparator-gate circuit which will short circuit the two integrating circuits when the higher voltage decays to a level which is equal to or near the other lower voltage. The automatic gain control system thus constructed, according to this invention, reduces or entirely eliminates the interdependency of the discharge and "hang" times.

Other objects and features of this invention will become apparent to those skilled in the art by referring to the specific embodiments described in the following specification and shown in the accompanying drawing in which.

Figure 1:
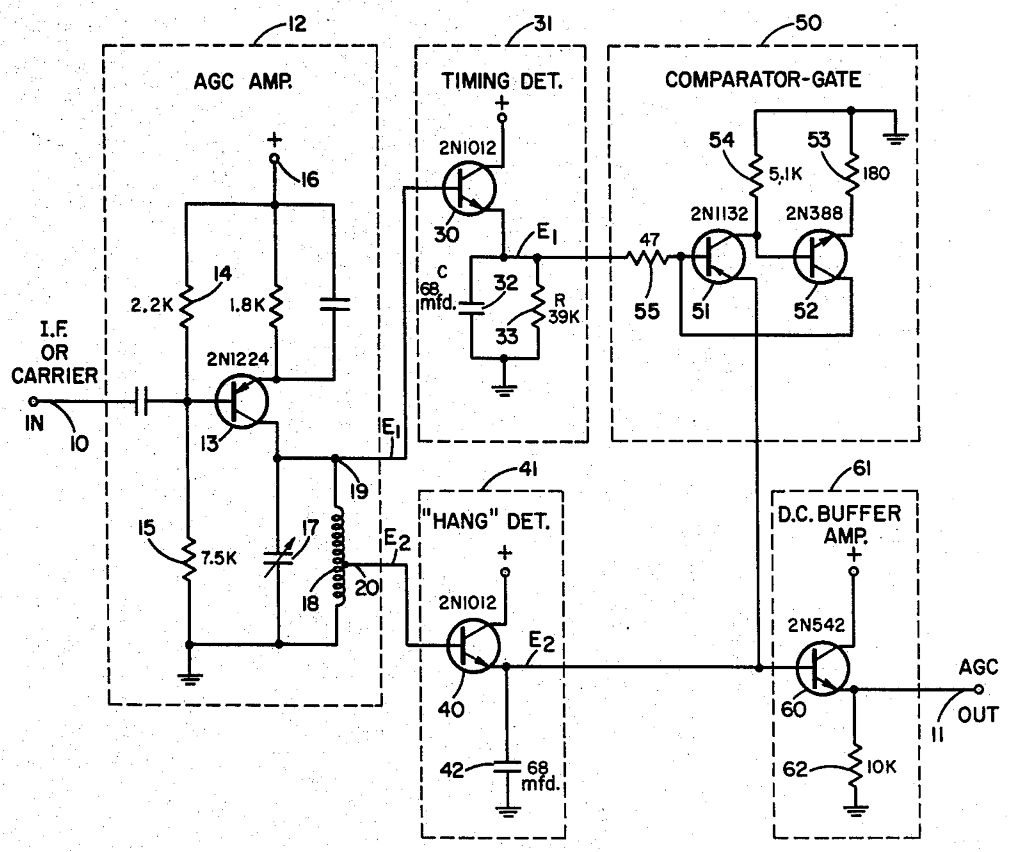
FIG. 1 is a circuit diagram of a preferred embodiment of this invention.
Figures 2, 3, 4:
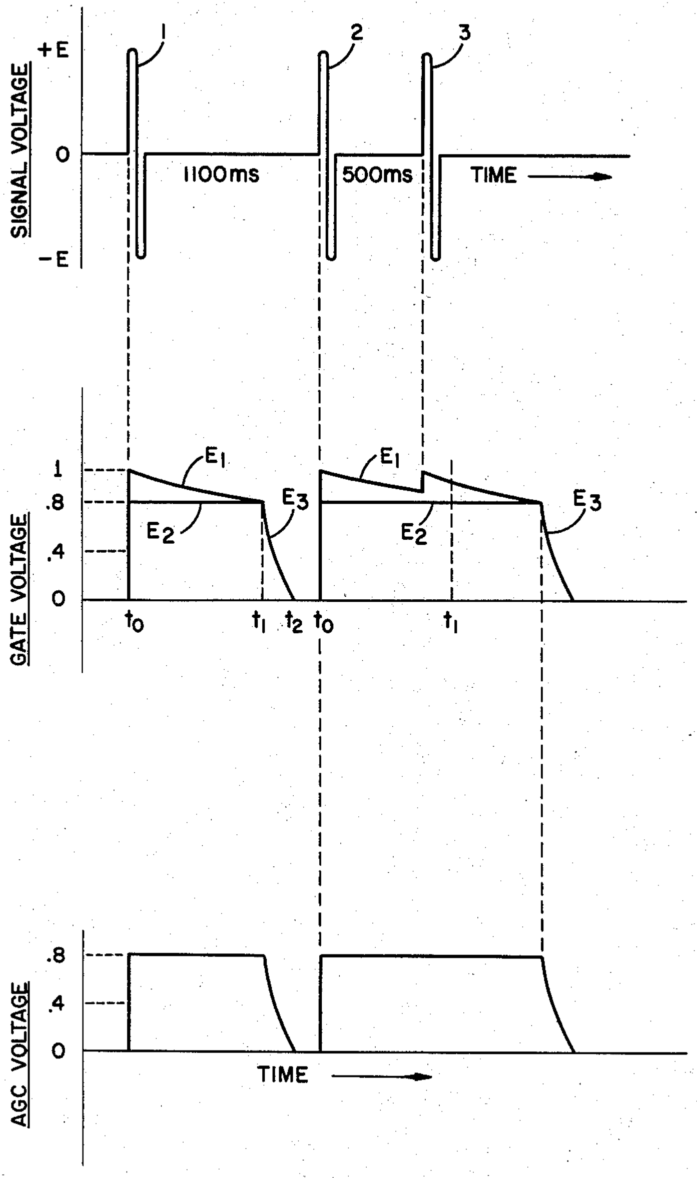
FIGS. 2, 3 and 4 are waveforms of voltages at important points throughout the circuitry of FIG. 1.

To input terminal 10 is applied an intermediate or carrier frequency of the wave received by the receiving equipment, not shown, and at output terminal 11 appears an automatic gain control voltage which is fed back to the IF or RF amplifiers of the receiving equipment, the sensitivity of which is to be controlled. While the input signal at terminal 10 may be a continuous wave, it could be intermittent, as shown in FIG. 2, where long intervals of no energy may occur between bursts or pulses of high frequency energy. These intervals may be quite long even in normal voice signals. The AGC amplifier 12 comprises the transistor 13 of the P-N-P type, the base being appropriately biased by the potentiometer including resistors 14 and 15 connected between positive voltage terminal 16 and ground. The collector circuit of the amplifier is tuned to the incoming frequency by the tank circuit including tuning condenser 17 and inductance 18.

According to an important feature of this invention, two outputs are taken from the amplifier 12, one output producing a higher voltage, $E_1$, than the other output voltage, $E_2$. The two signal voltages are conveniently obtained by taps 19 and 20 on the inductance coil 18. The higher voltage $E_1$, at tap 19, is applied to the base of transistor 30 of the timing detector 31. The transistor 30 is of the N-P-N type, in the example illustrated, and has an emitter-follower circuit comprising the integrating circuit including storage condenser 32 connected between the emitter and ground and shunted by the resistance 33. The emitter end of the integrating circuit quickly charges to a D.C. voltage proportional to the peak amplitudes of the first burst of carrier energy arriving at input terminal 10. This D.C. voltage will, for convenience, be also labeled $E_1$ since it is proportional to and nearly equal to the carrier voltage $E_1$ at tap 19.

The carrier voltage $E_2$ obtained at the lower-voltage tap 20 is applied to the base of the transistor 40 of the "hang" detector 41. Transistor 40 is likewise of the N-P-N type and has an emitter-follower circuit including condenser 42. Because condenser 42 has no resistor in shunt therewith, the time constant or "hang" time of condenser 42 can be made indefinitely long. As shown in FIG. 3, the decay rate of $E_2$ is practically zero.

According to the next feature of this invention, the direct current voltages $E_1$ and $E_2$ of the detectors 31 and 41 are compared in the comparator-gate 50. The transistors 51 and 52 of the comparator-gate 50 are so arranged that the integrating circuits 32—33 and 42 are effectively short circuited to quickly discharge condensers 32 and 42 when voltage $E_1$ decays to a value equal to voltage $E_2$. Transistor 51 is of the P-N-P type while transistor 52 is of the N-P-N type, the collector of each being connected, regeneratively, to the base of the other. The emitter of transistor 52 is connected to ground through the relatively low resistance of current-limiting resistor 53, while the collector of transistor 51 is connected to ground through the relatively high load resistance of resistor 54. D.C. voltage $E_2$ is applied to the emitter of transistor 51, while the base of transistor 51 is connected to the D.C. voltage $E_1$ through current-limiting resistor 55. While the base of transistor 51 is at a higher positive potential than the emitter, transistor 51 is effectively cut off and is nonconducting in all its circuits. When, however, the potential of the base becomes equal to or less than the potential of the emitter, the transistor 51 becomes conductive, transistor 52 turns on regeneratively driving transistor 51 more conductive, and the upper terminals of condensers 32 and 42 are effectively grounded. Referring to FIG. 3, as the base potential $E_1$ decays to the level of the relatively stable $E_2$, a point in time, represented by $t_1$, is reached at which the two integrating circuits are rapidly discharged, the collapsing voltage being represented by the line $E_3$. If now, the time interval between RF bursts 2 and 3, referring to FIGS. 2 and 3, is shorter than time interval $t_0$–$t_1$, the voltage $E_1$ may not decay to the level of $E_2$, before arrival of the next burst, whereupon the integrating circuits are recharged. As long as the bursts reoccur at this higher rate, no gating action occurs and condenser 42 will remain charged to $E_2$.

The output voltage, $E_2$, of the "hang" detector 41 is applied to the base of transistor 60 of the D.C. buffer amplifier 61. Preferably, the transistor 60 is connected also as an emitter-follower amplifier with the load resistance 62 across which is connected the AGC output. As shown in FIG. 4, the AGC output remains relatively high and stable throughout modulating periods when the rate of received bursts is relatively high. When long intervals of no signal occur, the AGC output voltage drops to zero, permitting the IF or RF amplifier to which it is applied to stand at maximum sensitivity.

It has been determined after extensive experimentation with ordinary voice signals on a single sideband signal with suppressed carrier that a "hang" time of 800 milliseconds and a discharge time of 200 milliseconds will produce the most desirable results as far as signal distortion is concerned. These results were obtained with transistors of the commercial types and with the circuit parameters and component values indicated on the drawing. The amplitude of the intermittent wave and the dead time between bursts may vary widely with minimum distortion.

What is claimed is:

1. In an automatic gain control system for an amplifier of intermittent information, a signal voltage source adapted to derive signal voltages from said amplifier, said source having a first and a second terminal adapted to deliver, respectively, signal voltages of high and low values, a first integrating circuit and a second integrating circuit, said circuits being coupled, respectively, to said first and second terminals, said integrating circuits having, respectively, short and long time constants, a comparator-switch comprising a transistor with a collector, a base and an emitter electrode, the emitter-collector circuit of said transistor being connected across said second integrating circuit, the base of said transistor being connected to said first integrating circuit, said transistor being of the type which is normally on and is conductive only when said base potential exceeds said emitter potential, a regenerative circuit coupled between the output and input circuits of said transistor for accelerating the switching action of the transistor, and a buffer amplifier coupled between said second integrating circuit and said amplifier for controlling the sensitivity of said amplifier.

2. In an automatic gain control system for a receiver of intermittent information, a signal voltage source, said source having a first and a second terminal adapted to deliver, respectively, signal voltages of first and second values, said first signal voltage being relatively higher than said second signal voltage, a first and a second integrating circuit, said first integrating circuit having a relatively short time constant and being connected to said first terminal, a second integrating circuit having a relatively long time constant and being connected to said second terminal, means for deriving an automatic gain control voltage from across said second integrating circuit; and switch means for abruptly discharging said second integrating circuit when the voltage of said first integrating circuit decays to a predetermined value with respect to the voltage of said second integrating circuit, said switch means comprising a first transistor with a control electrode, a common output electrode and an input electrode with a variable impedance between said input and output electrodes depending upon the relative potential between said control electrode and one of the other electrodes, said control electrode being connected to said first integrating circuit and said input electrode being connected to said second integrating circuit so that as the voltage of said first integrating circuit decays to a predetermined level with respect to the voltage of said second integrating circuit said impedance changes from a relatively high value to a relatively low value, and a regenerative circuit coupled from said output electrode to said control electrode for regeneratively accelerating said impedance change to abruptly discharge said second integrating circuit.

3. In an automatic gain control system for a receiver of intermittent information, as defined in claim 2, said regenerative circuit comprising a second transistor responsive to the voltage of said output electrode of said first transistor and coupled to said control electrode for regeneratively driving said control electrode in the proper direction to accelerate discharge of said second integrating circuit.

References Cited in the file of this patent

UNITED STATES PATENTS

| | | |
|---|---|---|
| 2,280,563 | Weinberger | Apr. 21, 1942 |
| 2,658,141 | Kurland et al. | Nov. 3, 1953 |

OTHER REFERENCES

Article: "Improved A.V.C. for Side Band and C.W.," by G. W. Luick, pages 46 and 174 of QST for October 1957.